United States Patent
Akkawi et al.

(10) Patent No.: US 11,782,832 B2
(45) Date of Patent: Oct. 10, 2023

(54) LOW LATENCY HOST PROCESSOR TO COHERENT DEVICE INTERACTION

(71) Applicant: VMware, Inc., Palo Alto, CA (US)

(72) Inventors: Isam Wadih Akkawi, Santa Clara, CA (US); Andreas Nowatzyk, San Jose, CA (US); Pratap Subrahmanyam, Saratoga, CA (US); Nishchay Dua, Pleasanton, CA (US); Adarsh Seethanadi Nayak, San Jose, CA (US); Venkata Subhash Reddy Peddamallu, Sunnyvale, CA (US); Irina Calciu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 23 days.

(21) Appl. No.: 17/411,792

(22) Filed: Aug. 25, 2021

(65) Prior Publication Data
US 2023/0069152 A1    Mar. 2, 2023

(51) Int. Cl.
| G06F 13/16 | (2006.01) |
|---|---|
| G06F 13/40 | (2006.01) |
| G06F 12/08 | (2016.01) |
| G06F 12/0804 | (2016.01) |

(52) U.S. Cl.
CPC ........ *G06F 12/0804* (2013.01); *G06F 13/1668* (2013.01); *G06F 13/4027* (2013.01); *G06F 2212/1024* (2013.01); *G06F 2212/1032* (2013.01)

(58) Field of Classification Search
CPC .............. G06F 13/1668; G06F 13/4027; G06F 12/0804; G06F 2212/1024; G06F 2212/1032
USPC ....................................................... 711/143
See application file for complete search history.

(56) References Cited

U.S. PATENT DOCUMENTS

| 10,761,984 | B2 | 9/2020 | Calciu et al. | |
|---|---|---|---|---|
| 10,929,295 | B2 | 2/2021 | Gandhi et al. | |
| 11,068,400 | B2 | 7/2021 | Kolli et al. | |
| 11,442,865 | B1* | 9/2022 | Calciu et al. | G06F 12/0862 |
| 2013/0173837 | A1 | 7/2013 | Glaser et al. | |
| 2014/0040561 | A1* | 2/2014 | Lih et al. | G06F 12/0831 711/146 |
| 2014/0052905 | A1* | 2/2014 | Lih et al. | G06F 13/1663 711/146 |
| 2020/0034176 | A1 | 1/2020 | Calciu et al. | |
| 2020/0034200 | A1 | 1/2020 | Calciu et al. | |
| 2020/0034297 | A1 | 1/2020 | Calciu et al. | |
| 2020/0242035 | A1 | 7/2020 | Kolli et al. | |
| 2021/0373951 | A1* | 12/2021 | Malladi et al. | G06F 12/0815 |
| 2021/0374080 | A1* | 12/2021 | Horwich et al. | G06F 12/08 |

* cited by examiner

*Primary Examiner* — Christopher B Shin
(74) *Attorney, Agent, or Firm* — Kim & Stewart LLP (57) ABSTRACT

In a computer system, a processor and an I/O device controller communicate with each other via a coherence interconnect and according to a cache coherence protocol. Registers of the I/O device controllers are mapped to the cache coherent memory space to allow the processor to treat the registers as cacheable memory. As a result, latency of processor commands executed by the I/O device controller is decreased, and size of data stored in the I/O device controller that can be accessed by the processor is increased from the size of a single register to the size of an entire cache line.

19 Claims, 9 Drawing Sheets

LOW LATENCY HOST PROCESSOR TO COHERENT DEVICE INTERACTION

BACKGROUND

Computer systems have I/O device controllers, e.g., a networking card, a storage card, and an accelerator, that typically reside on an I/O bus, such as the Peripheral Component Interconnect Express (PCIe®) bus. These I/O device controllers contain a large set of registers and CPUs of the computer systems communicate with the I/O device controllers through register accesses, e.g., by writing to and reading from the registers.

To inform the I/O device controller of a desired action, the CPU issues a write transaction on the PCIe bus to write a request for the desired action to a register of the I/O device controller. These write transactions are serialized and ordered, in that the CPU idles its execution waiting for an earlier instruction to complete and for the write transaction to complete, before it resumes execution. This stalls the CPU and wastes precious CPU clocks from doing useful work.

In addition, after the write transaction has completed, the CPU waits for an interrupt or employs memory polling to obtain the status of the request for the desired action. For memory polling, the CPU spins in a loop, repeatedly issuing a memory read to obtain completion status posted by the I/O device.. Memory polling wastes CPU cycles if performed too frequently and increases I/O latency if performed too infrequently

SUMMARY

One embodiment is a method for operating an I/O device controller that is connected to a processor via a coherence interconnect. The method includes detecting that the processor updated a first cache line, wherein the first cache line is stored in a local memory of the I/O device controller and retrieved into a cache of the processor; after the first cache line, as updated by the processor, is written to the local memory, retrieving a command from the first cache line and executing the command; and writing a result of executing the command to a second cache line stored in the local memory of the I/O device controller.

Further embodiments include a non-transitory computer-readable storage medium comprising instructions that cause a computer system to carry out the above method, as well as a computer system configured to carry out the above method.

DETAILED DESCRIPTION

One or more embodiments provide an improved method and system for CPUs to communicate with I/O device controllers. In one or more embodiments, registers of the I/O device controllers are mapped to a cache coherent memory space of the CPUs. Mapping the device registers to the cache coherent memory space allows the CPUs to treat the registers as cacheable memory. This not only decreases latency as a result of not accessing the registers in the I/O device controller but also avoids the serialization cost. Another advantage is that the CPU can read/write multiple registers through its normal caching and prefetching mechanism for the cache coherent memory space. Also, the CPU can be provided a full cache line worth of data that is consistent. In addition, the data structures, such as the device registers, of the I/O controller can be mapped to other address spaces to expose them to any guest VMs and/or applications. The I/O device can maintain multiple sets of data structures so that the guest VM, applications, or other software layers can interact with those structures.

Figure 1A:
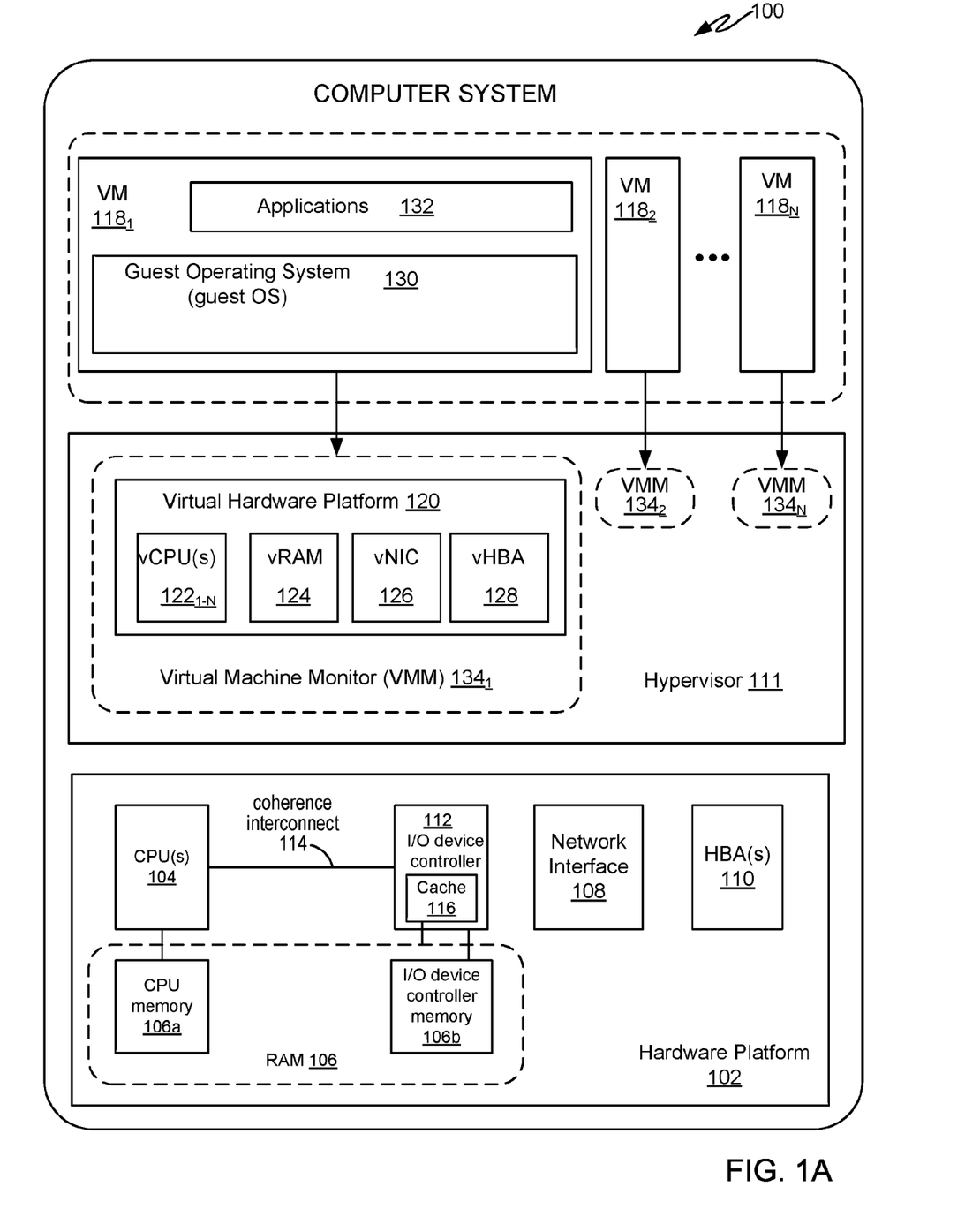
FIG. 1A depicts a block diagram of a computer system that is representative of a virtualized computer architecture in which embodiments may be implemented.

FIG. 1A is a block diagram of a computer system that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, random access memory (RAM) 106 as system memory, one or more network interfaces 108 for connecting to a network, and one or more host bus adapters (HBA) 110 for connecting to a storage system. In addition, hardware platform 102 includes an I/O device controller 112 (e.g., disk, network, or graphics controller), which may include a cache 116. I/O device controller 112 communicates with one or more CPUs 104 via coherence interconnect 114. Coherence interconnect 114 may be any point-to-point coherence interconnect between processors, such as the Intel® UltraPath Interconnect (UPI), which is a successor to the Intel® QuickPath Interconnect (QPI), which supports a cache coherence protocol. In another embodiment, coherence interconnect 114 is a Compute Express Link™ (CXL™) operating with CXL-cache/mem protocols and using signal lanes of a PCIe bus. In still another embodiment, coherence interconnect 114 operates with CCIX® (cache coherent interconnect for accelerators) protocol. Any arrangement of the I/O device controller 112 that includes a connection to the coherence interconnect among processors present in computer system 100 is sufficient.

A virtualization software layer, referred to hereinafter as hypervisor 111, is installed on top of hardware platform 102. Hypervisor 111 makes possible the concurrent instantiation and execution of one or more VMs $118_1$-$118_N$. The interaction of a VM 118 with hypervisor 111 is facilitated by the virtual machine monitors (VMMs) 134. Each VMM 134₁-134_N is assigned to and monitors a corresponding VM 118₁-118_N. In one embodiment, hypervisor 111 may be a hypervisor implemented as a commercial product in VMware's vSphere® virtualization product, available from VMware Inc. of Palo Alto, CA. In an alternative embodiment, hypervisor 111 runs on top of a host operating system which itself runs on hardware platform 102. In such an embodiment, hypervisor 111 operates above an abstraction level provided by the host operating system.

After instantiation, each VM 118₁-118_N encapsulates a virtual hardware platform that is executed under the control of hypervisor 111, in particular the corresponding VMM 134₁-134_N. For example, virtual hardware devices of VM 1181 in virtual hardware platform 120 include one or more virtual CPUs (vCPUs) 122₁-122_N, a virtual random access memory (vRAM) 124, a virtual network interface adapter (vNIC) 126, and virtual HBA (vHBA) 128. Virtual hardware platform 120 supports the installation of a guest operating system (guest OS) 130, on top of which applications 132 are executed in VM 118₁. Examples of guest OS 130 include any of the well-known commodity operating systems, such as the Microsoft Windows® operating system, the Linux® operating system, and the like.

It should be recognized that the various terms, layers, and categorizations used to describe the components in FIG. 1A may be referred to differently without departing from their functionality or the spirit or scope of the disclosure. For example, VMMs 134₁-134_N may be considered separate virtualization components between VMs 118₁-118_N and hypervisor 111 since there exists a separate VMM for each instantiated VM. Alternatively, each VMM may be considered to be a component of its corresponding virtual machine since each VMM includes the hardware emulation components for the virtual machine.

Figure 1B:
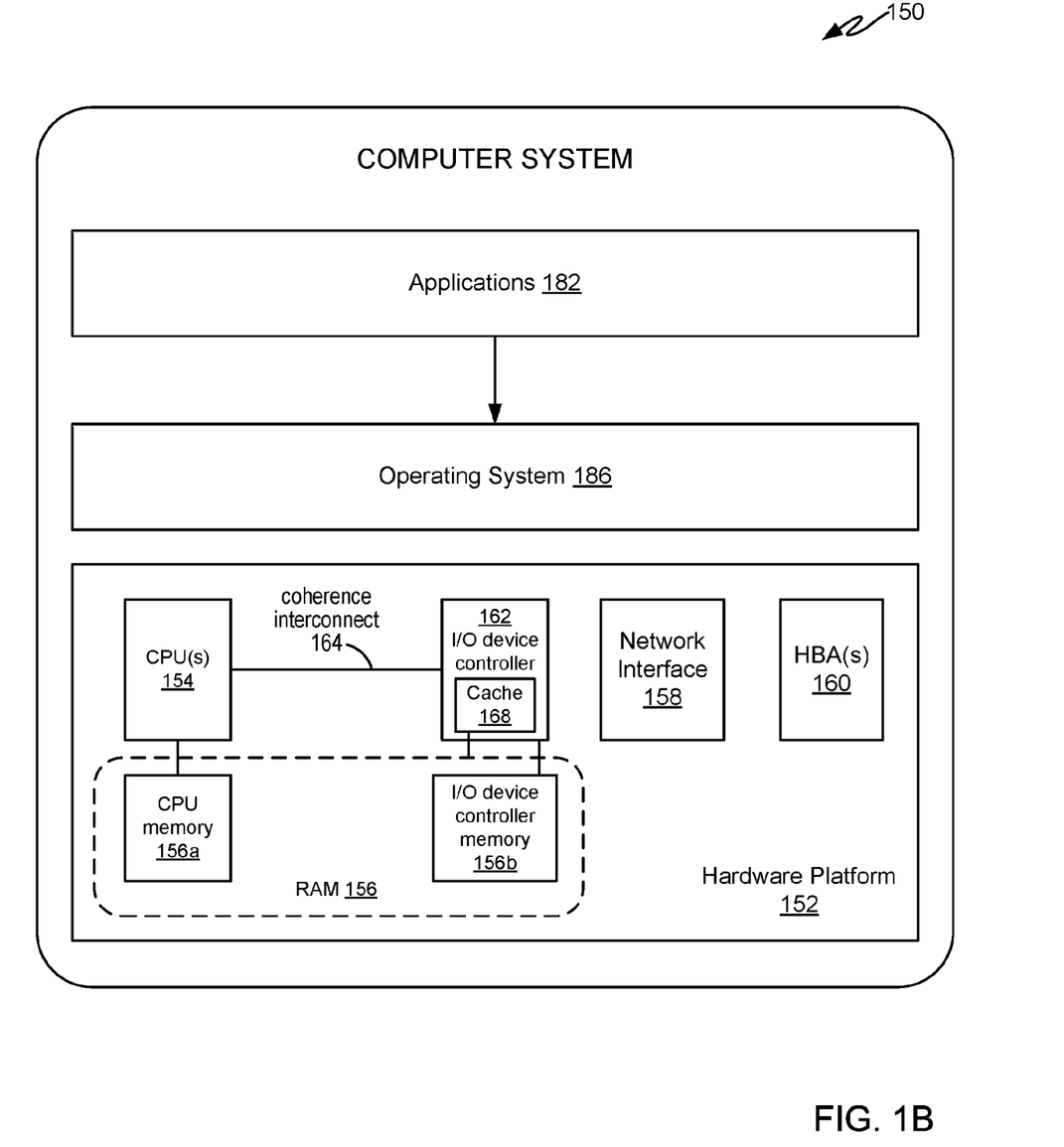
FIG. 1B depicts a block diagram of a computer system that is representative of a non-virtualized computer architecture in which embodiments may be implemented.

FIG. 1B is a block diagram of a computer system that is representative of an alternative computer architecture in which embodiments may be implemented. As illustrated, computer system 150 includes a hardware platform 152 that is similar to hardware platform 102. Hardware platform 152 includes conventional computer hardware components, such as one or more items of processing hardware such as central processing units (CPUs) 154, random access memory (RAM) 156 as system memory, one or more network interfaces 158 for connecting to a network, and one or more host bus adapters (HBA) 160 for connecting to a storage system. In addition, hardware platform 152 includes an I/O device controller 162, which may include cache 168. I/O device controller 162 communicates with one or more CPUs 154 via coherence interconnect 164. Coherence interconnect 164 may be any point-to-point coherence interconnect between processors such as those identified above for coherence interconnect 114. Any arrangement of I/O device controller 162 includes a connection to the coherence interconnect among processors present in computer system 150 is sufficient. Hardware platform 152 supports the installation of an operating system 186, on top of which applications 182 are executed in computer system 150. Examples of an operating system 186 include any of the well-known commodity operating systems, such as the Microsoft Windows® operating system, the Linux® operating system, and the like.

Figure 2A:
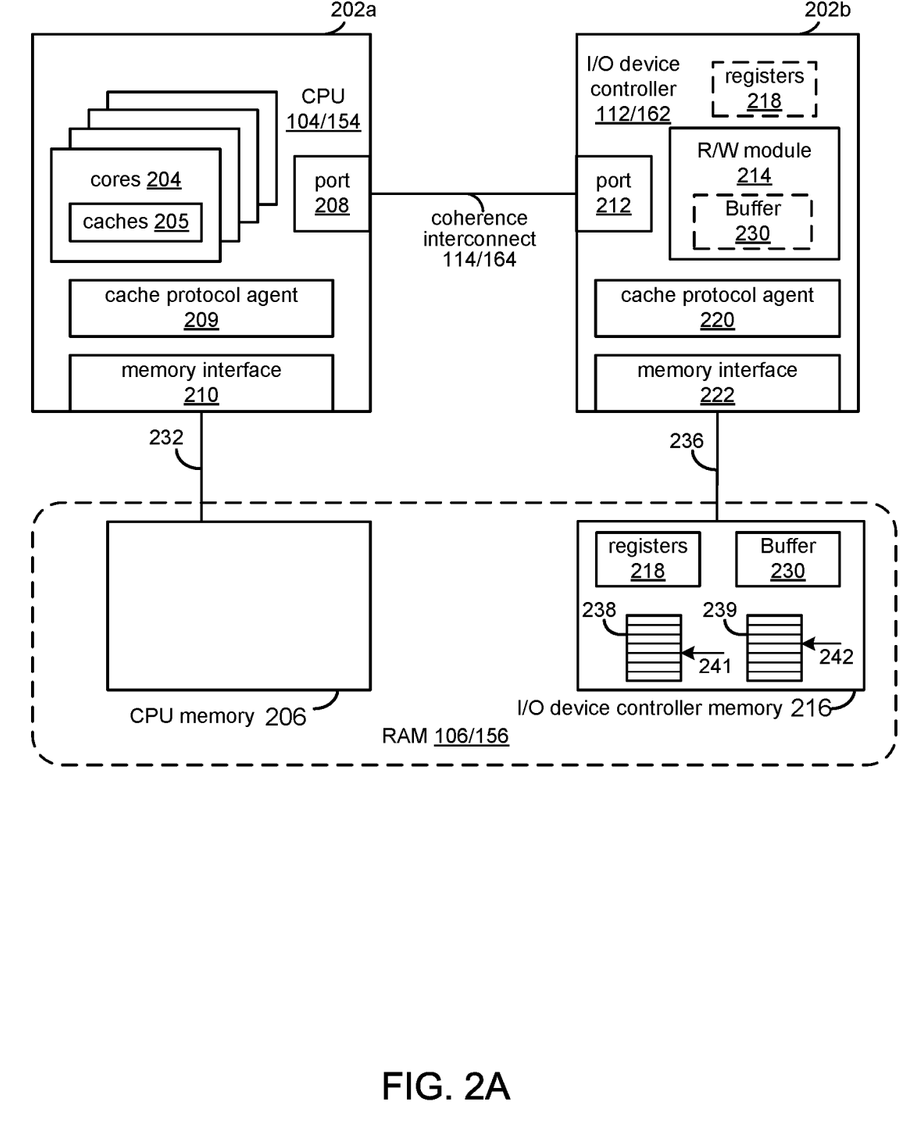
FIG. 2A depicts a block diagram of a pair of sockets for a CPU and an I/O device controller, in an embodiment.

FIG. 2A depicts a block diagram of a pair of CPU sockets, a first socket 202a for a representative one of CPUs 104 (or CPUs 154), and another socket 202b for an I/O device controller 112/162. The CPU includes one or more processing cores 204, caches 205 for cores 204 (often implemented as a hierarchy of multiple cache levels), a cache protocol agent 209 for enforcing the cache coherence protocol, a communications port 208 connected to a coherence interconnect (CI) (e.g., coherence interconnect 114 or coherence interconnect 164), and a memory interface 210 connected via memory bus 232 to CPU memory 206, which is allocated from RAM 106 or RAM 156.

I/O device controller 112/162 includes a cache protocol agent 220 for enforcing the cache coherence protocol, a communications port 212 connected to the coherence interconnect, and a memory interface 222 connected via memory bus 236 to I/O device controller memory 216, which is allocated from RAM 106 or RAM 156 as coherent memory, which means cache lines from I/O device controller memory 216 may be accessed by the CPU by sending requests on the coherence interconnect and cached by the CPU.

As is well known, caches 205 are used to reduce the average cost to access data from memory. Data is transferred between CPU memory 206 and caches 205 in blocks of fixed size, called cache lines or cache blocks. When a cache line is copied from CPU memory 206 into caches 205, a cache entry is created, which includes both copied data and the requested memory location (called a tag). When the CPU requests to read or write a location in CPU memory 206, caches 205 first check for a corresponding entry contained therein. That is, caches 205 search for the contents of the requested memory location in any cache lines that might contain that address. If the CPU finds that the memory location resides in caches 205, a cache hit has occurred, and the CPU immediately reads or writes the data in the cache line. However, if the CPU does not find the memory location in caches 205, a cache miss has occurred. For a cache miss, caches 205 allocate a new entry and copy data from CPU memory 206. The request is then fulfilled from the contents of caches 205.

Communication ports 208, 212, mentioned above, support a coherence protocol, which is designed to maintain cache coherence in a system with many processors, each having its own cache or caches. With I/O device controller 112/162 residing in socket 202b and having its own communication port 212 that supports the coherence protocol, I/O device controller 112/162 can monitor and participate in the coherency protocol that keeps the processor caches coherent.

Cache coherence on the coherence interconnect is maintained according to a standard coherence protocol, such as modified, exclusive, shared, invalid (MESI) protocol or modified, exclusive, shared, invalid, forwarded (MESIF) protocol. In these protocols, cache lines marked invalid signify that the cache line has invalid data, and fresh data must be brought into caches 205 from CPU memory 206. Cache lines marked exclusive, shared, and forwarded (in the MESIF protocol) all signify that the cache line has valid data, but the cache line is clean (not modified), so the cache line can be discarded from the cache without writing data of the cache line back to CPU memory 206. A cache line marked as modified signifies the cache line is modified or dirty, and data of the cache line must be written back to CPU memory 206 before the cache line is discarded from caches 205.

Each cache protocol agent can initiate and respond to transactions on the coherence interconnect by sending and receiving messages on the coherence interconnect. In the embodiments illustrated herein, cache protocol agent 209 cooperates with cache protocol agent 220 by sending messages, including broadcast messages, over the coherence interconnect. In the protocol, one of the cache protocol agents is an owner of a set of cache lines and contains information regarding those cache lines. The other cache protocol agents send messages to the owner agent requesting a cache line or to find the status of the cache line owned by the owner agent. The owner agent may service the request directly or request that another cache protocol agent satisfy the request.

When the CPU accesses a cache line that is not in its caches 205, at any level of the cache hierarchy, it is cache protocol agent 209 of the CPU that requests the cache line from memory (e.g., CPU memory 206 or I/O device controller memory 216). Thus, cache protocol agent 209 in CPU 104 issues a load cache line transaction on coherence interconnect 114. The transaction can be 'Load Shared' for sharing the cache line or 'Load Exclusive' for cache lines that will be modified. A cache line that is loaded as 'Shared' means that the line probably will not be modified. In contrast, a cache line that is loaded as 'Exclusive' is considered potentially dirty because it is not certain the cache line will be modified. When a cache line gets evicted from caches 205 to CPU memory 206, if it is modified, it must be written back to the memory from which it originated. The operation of writing the cache line is performed on coherence interconnect 114 as a write-back transaction. In the case of a write-back transaction, the cache line is actually dirty rather than potentially dirty. In the description that follows, a write-back transaction is converted to and handled as a message, 'WB_Data_CL.'

To confirm whether a cache line is dirty or not, a cache protocol agent, such as cache protocol agent 220 in I/O device controller 112/162, can snoop the cache line in accordance with the coherence interconnect protocol. If the cache line is dirty, the snoop triggers a write-back transaction, thereby exposing the dirty cache line that was residing in the processor cache. Cache protocol agents 209 and 220 also have information regarding the cache lines that are resident in the processor caches. This information is accessible via coherence interconnect 114.

In the embodiments, registers 218 of I/O device controller 112/162 are mapped to addressable space in I/O device controller memory 216, and a command queue 238 and a completion queue 239 are allocated in I/O device controller memory 216. Command queue 238 stores commands to be executed by I/O device controller 112/162 and completion queue 239 stores the result of the commands executed by I/O device controller 112/162. In one embodiment, both command queue 238 and completion queue 239 are set up as circular buffers, with all slots in command queue 238 initialized to 0 to indicate an invalid command and all slots in completion queue 239 initialized to 0 to indicate an invalid result. Command queue 238 includes a pointer 241 that references the next slot in completion queue 239 to be written, and increments pointer 241 each time a command in the slot is executed. Completion queue 239 includes a pointer 242 that references the next slot in completion queue 239 to be written, and increments pointer 242 each time a command execution result is written to the slot.

As a result of mapping registers 218 to addressable space in I/O device controller memory 216, and allocating command queue 238 and completion queue 239 in I/O device controller memory 216, all CPU interactions with I/O device controller 112/162 are now carried out in coherent memory space. Consequently, embodiments enable CPU interactions with I/O device controller 112/162 that are low latency and efficient (because the coherent memory space is cacheable, and can be fetched in the size of cache lines), and observable (reads and writes are visible, and state transitions are trackable). In addition, embodiments provide flexibility because the coherent memory space can be sized to meet the I/O device requirements.

I/O device controller 112/162 further includes a read/write module 214 with a buffer 230. In one or embodiments, read/write module 214 is implemented as a dedicated circuit, e.g., a controller circuit having a programmed microprocessor, and buffer 230 is allocated in I/O device controller memory 216. During enumeration of I/O devices, read/write module 214 is initialized to track accesses to cache lines of all pages of registers 218, command queue 238, and completion queue 239 in I/O device controller memory 216. The write operations executed by read/write module 214 are described below in conjunction with FIG. 5, and read operations executed by read/write module 214 are described below in conjunction with FIG. 9.

Figure 2B:
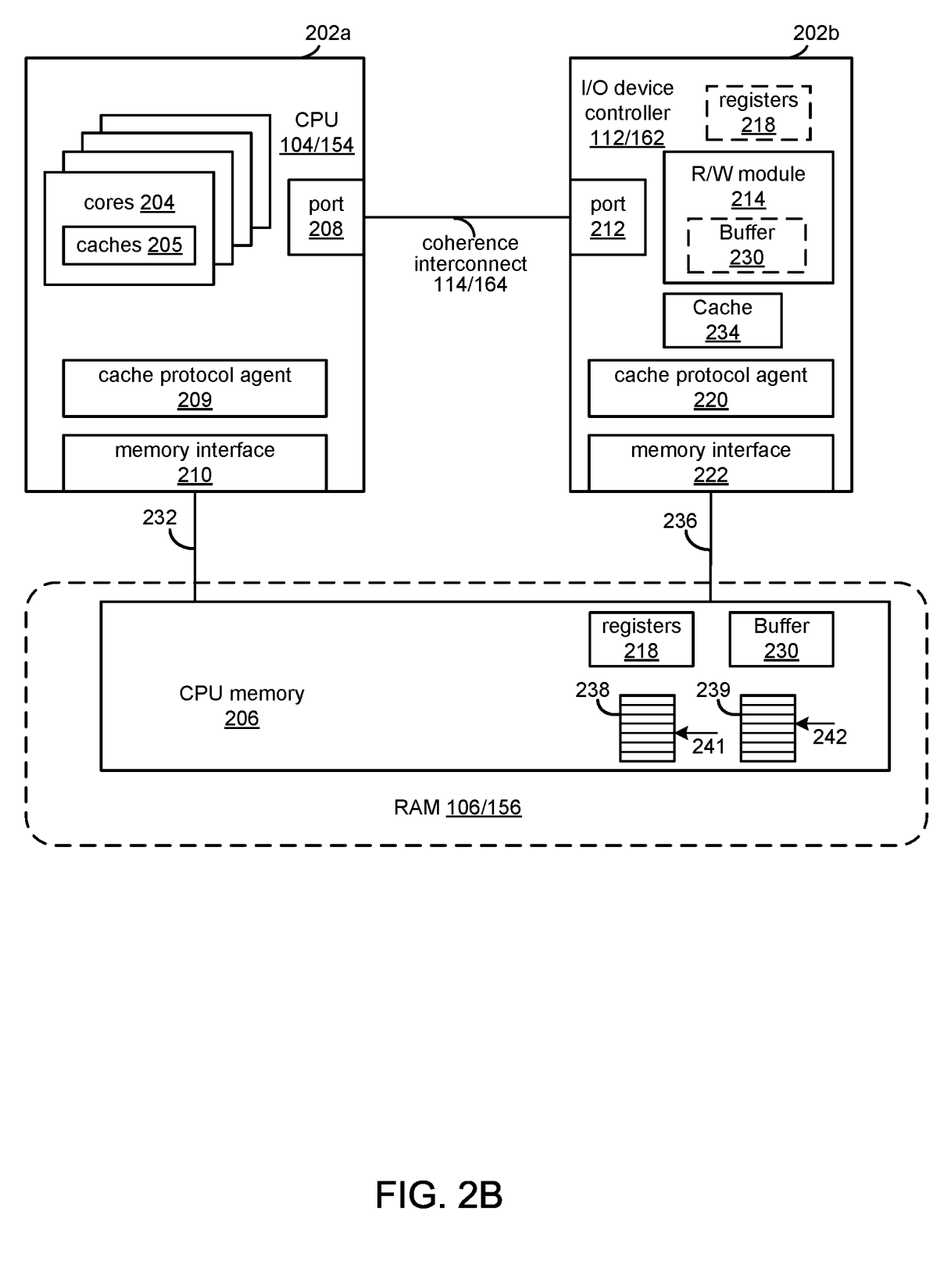
FIG. 2B depicts a block diagram of a pair of sockets for a CPU and an I/O device controller, in an embodiment.

FIG. 2B depicts a block diagram of a pair of sockets for a CPU and an I/O device controller, in another embodiment similar to that of FIG. 2A. However, I/O device controller 112/162 has a cache 234, which stores accesses to CPU memory 206. In addition, CPU memory 206, not the I/O device controller memory, contains registers 218, buffer 230, command queue 238, and completion queue 239. Thus, registers 218, buffer 230, command queue 238, and completion queue 239 can reside anywhere in cacheable, physical memory space of the CPU.

Figure 3:
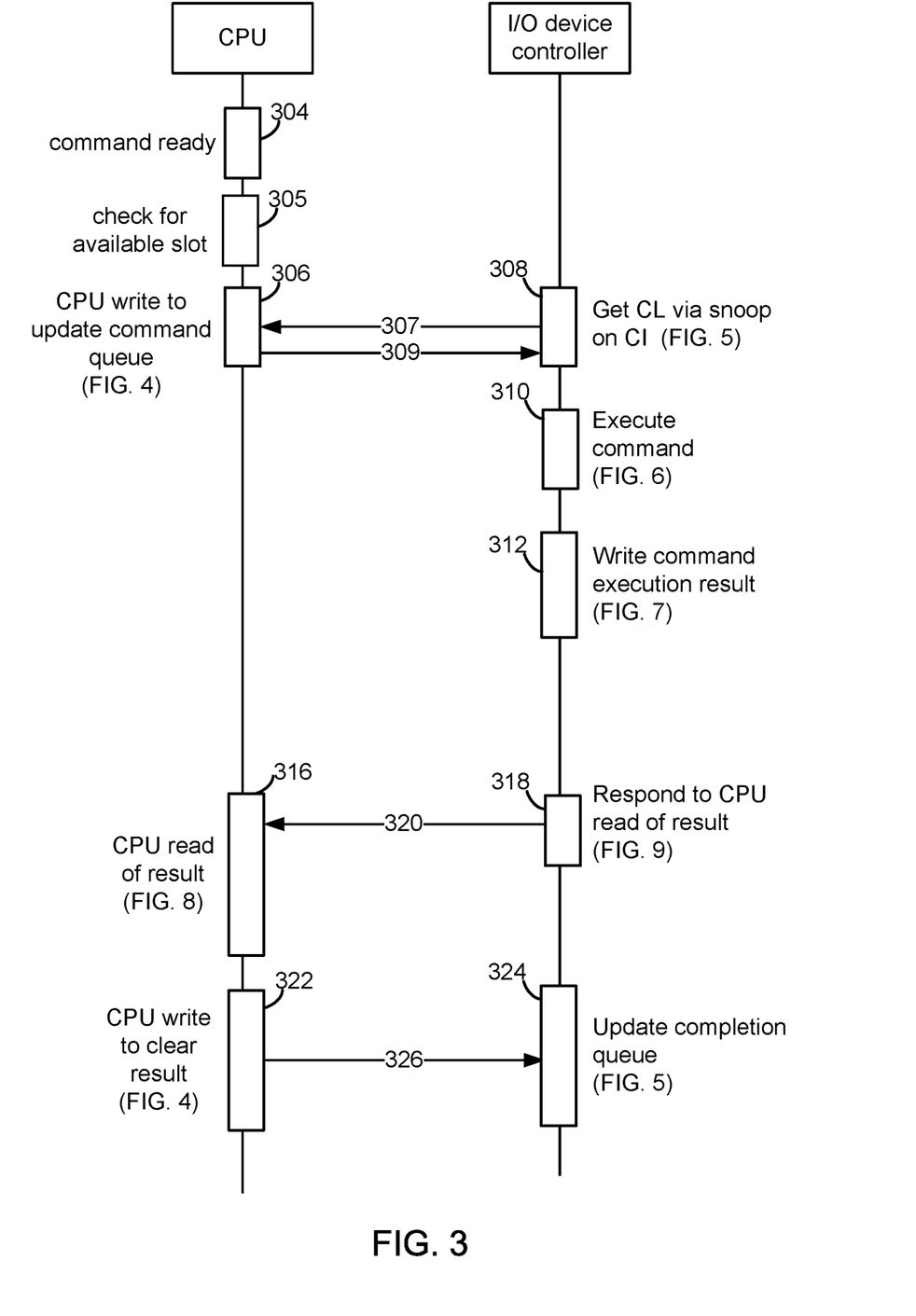
FIG. 3 illustrates with a timeline one example of CPU interaction with the I/O device controller.

FIG. 3 illustrates with a timeline one example of CPU interaction with the I/O device controller (e.g., I/O device controller 112 or I/O device controller 162). The CPU interaction with the I/O device controller begins in step 304 when the CPU determines that a command for the I/O device controller is ready. Then, in step 305, the CPU determines whether or not a free slot is available in command queue 238, e.g., by counting the number of outstanding commands and determining that they do not exceed the maximum number of slots in command queue 238. If there is a free slot in command queue 238, the CPU in step 306 executes the process depicted in FIG. 4 to update a cache line of command queue 238 that includes current contents of the next slot to be written, where the next slot to be written is determined from the current position of the command queue pointer. The update includes retrieving the cache line over the coherence interconnect as depicted by arrow 307 and overwriting the current contents of the next slot to be written with the command. In step 308, the I/O device controller carries out the process depicted in FIG. 5 to write out the cache line that the CPU updated, to command queue 238. The transmission of the updated cache line from the CPU to the I/O device controller is depicted by arrow 309.

Figure 6:
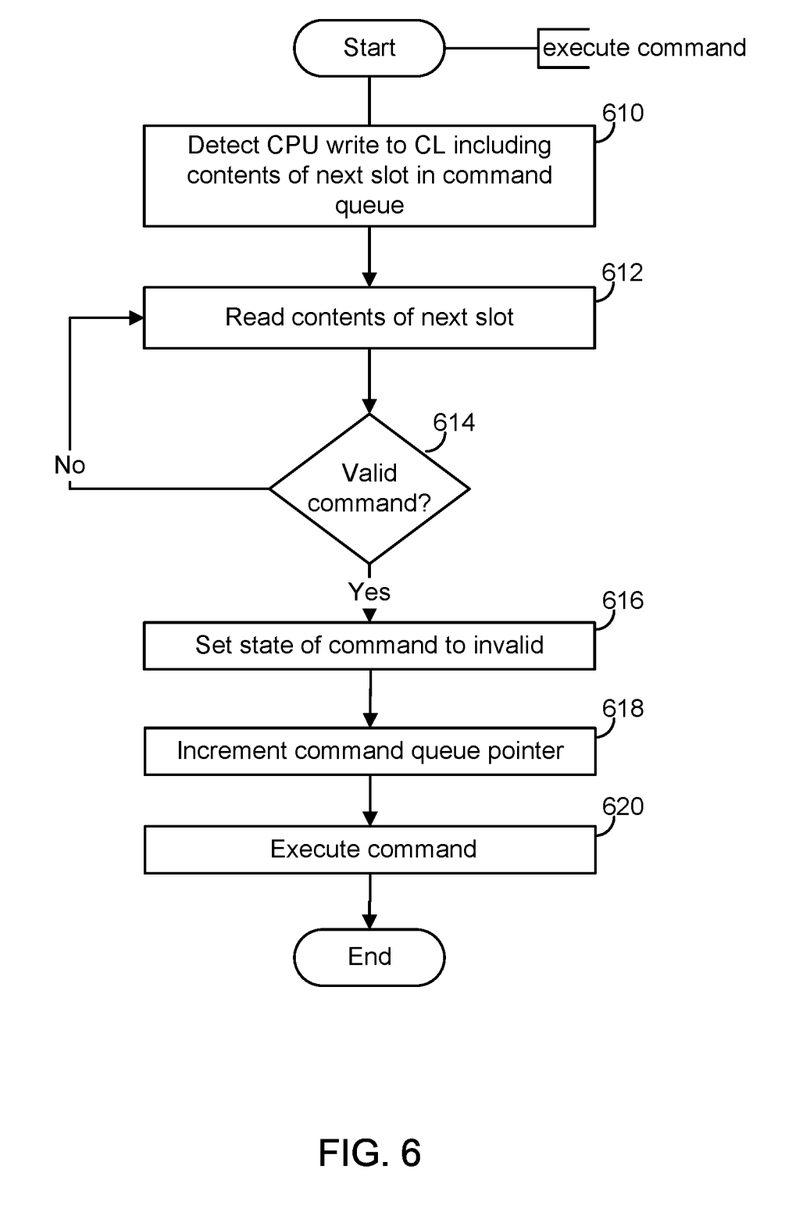
FIG. 6 depicts a flow of operations for command execution by the I/O device controller.
Figure 7:
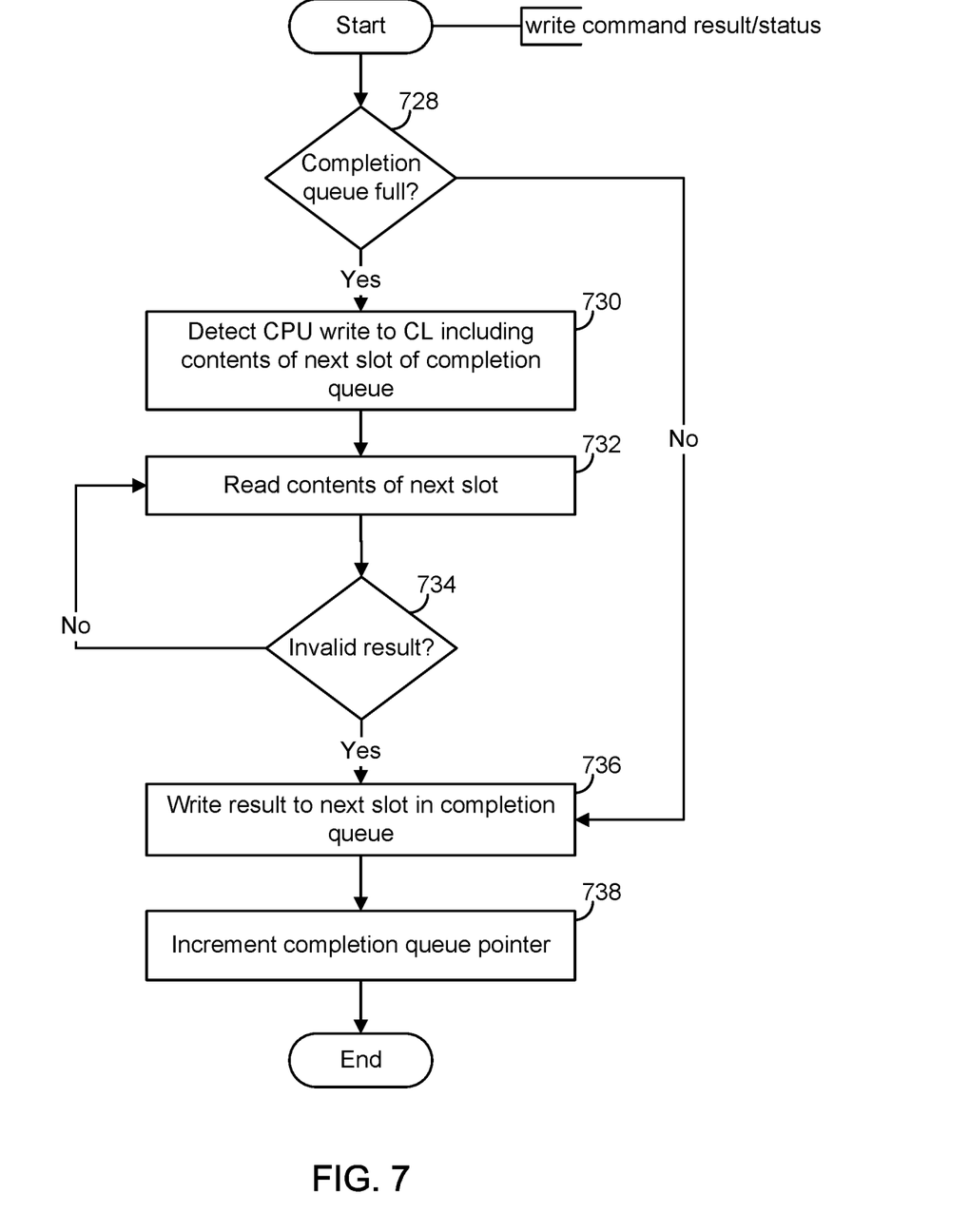
FIG. 7 depicts a flow of operations carried out by the I/O device controller after carrying out command execution depicted in FIG. 6.

Step 310, depicted in further detail in FIG. 6, includes command execution and is triggered in response to the CPU requesting a write of the cache line including contents of the next slot in command queue 238. Step 312, depicted in further detail in FIG. 7, represents the writing of the result of command execution in completion queue 239. The writing of the result of command execution in completion queue 239 can be detected either by CPU polling, which includes the CPU in step 316 periodically sending a request to read the result of command execution on the coherence interconnect (see FIG. 8) until the result of command execution has been written. Alternative to CPU polling, the I/O device controller may issue an interrupt to the CPU to inform the CPU that the result of command execution has been written, and the CPU in response to the interrupt sends the request to read the result of command execution on the coherence interconnect. Step 318, depicted in further detail in FIG. 9, represents the response to the CPU read by the I/O device controller. The return of read data, which is the result of command execution, is depicted by arrow 320.

Figure 4:
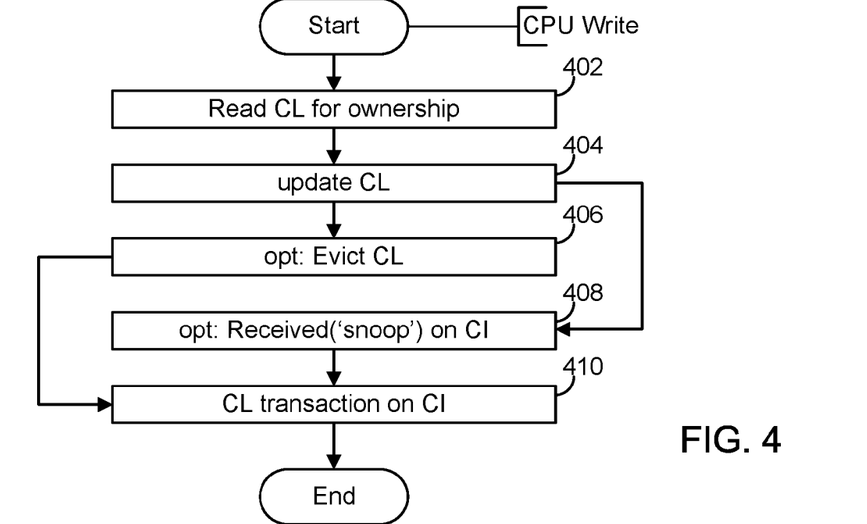
FIG. 4 depicts a flow of operations of a CPU performing a write.

After the CPU receives the result of command execution, the CPU in step 322 performs the process depicted in FIG. 4 to update the cache line containing the result of command execution to clear the completion slot in which the result of command execution was stored. In step 324, the I/O device controller carries out the process depicted in FIG. 5 to write out the cache line that the CPU updated, to completion queue 239. The transmission of the updated cache line from the CPU to the I/O device controller is depicted by arrow 326.

FIG. 4 depicts a flow of operations of a CPU performing a write. The write is preceded by an exclusive read of the cache line so that the CPU has ownership of the cache line. Thus, in step 402, the CPU issues a read-for-ownership transaction on the coherence interconnect so that it has an exclusive copy of the cache line. The read-for-ownership transaction includes an address of the cache line. In step 404, the CPU updates the exclusive copy. The updated cache line may be evicted by the CPU in step 406 or may be subject to a write-back as a result of a snoop message for the cache line appearing on the coherence interconnect (step 408). In either case, as a result of eviction or in response to the snoop message, the CPU in step 410 transmits the updated cache line on the coherence interconnect.

For example, in step 306, the CPU gets ownership of the cache line containing contents of the next slot in command queue 238, updates the cache line to include the command, and transmits the updated cache line with the command on the coherence interconnect as a result of eviction or in response to the snoop message. Similarly, in step 322, the CPU will get ownership of the cache line containing the result of command execution in completion queue 239, update the cache line to clear the result of command execution, and transmit the updated cache line on the coherence interconnect as a result of eviction or in response to the snoop message.

Figure 5:
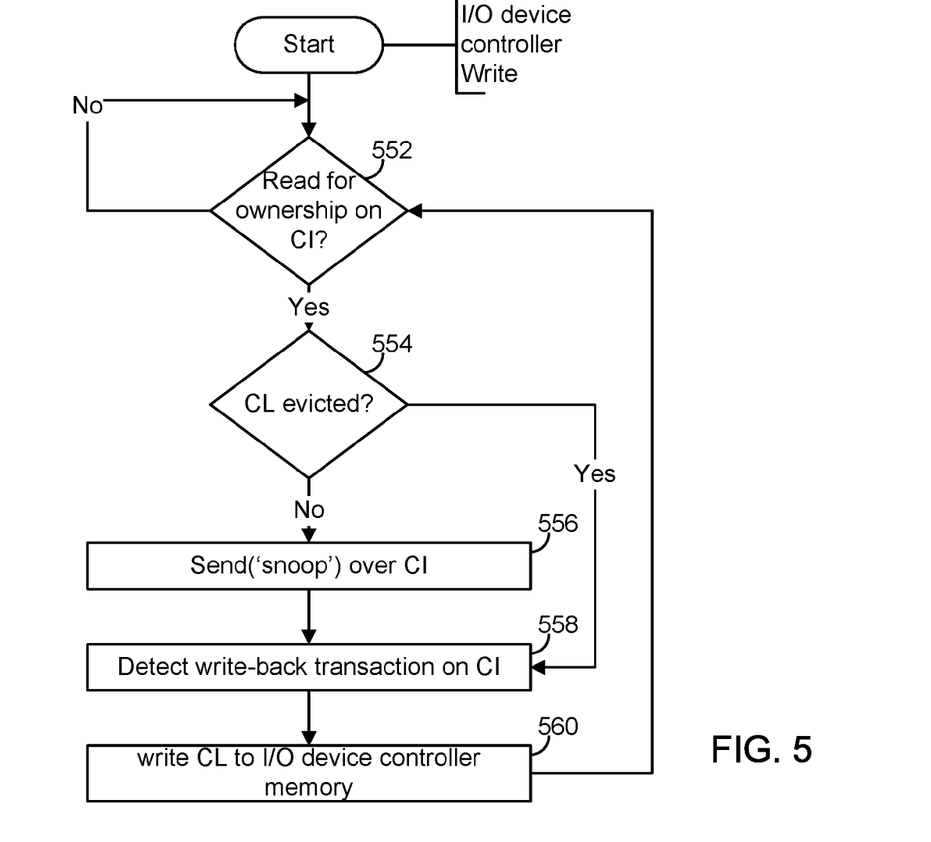
FIG. 5 depicts a flow of operations of the I/O device controller responding to the write by the CPU.

FIG. 5 depicts a flow of operations of the read/write module (e.g., read/write module 214) of the I/O device controller responding to the write by the CPU. In step 552, the read/write module determines that a read-for-ownership of the cache line has occurred, indicating that the cache line may be modified by the CPU. The read/write module waits a period of time for the CPU to perform the write in step 554. If the cache line is not evicted within the period of time (step 554; No), the read/write module in step 556 sends a snoop message on the coherence interconnect to get the cache line. When the cache line is evicted within the period of time (step 554; Yes) or snooped in step 556, the CPU issues a write-back transaction on the coherence interconnect and in response the read/write module detects the write-back transaction of the cache line on the coherence interconnect in step 558. In step 560, the read/write module writes out the contents of the cache line subject to the write-back transaction to the memory location of the cache line in I/O device controller memory 216. Alternatively, in the arrangement of FIG. 2B, the read/write module writes out the contents of the cache line subject to the write-back transaction to the memory location of the cache in CPU memory 206.

For example, in step 308, the read/write module writes out the contents of the cache line to which a command has been added by the CPU to command queue 238. Similarly, in step 324, the read/write module writes out the contents of the cache line in which command execution result has been cleared by the CPU to completion queue 239.

FIG. 6 depicts a flow of operations for command execution by the I/O device controller. The method of FIG. 6 begins in step 610 when the I/O device controller detects a CPU write to a location in I/O device controller memory 216, in accordance with the flow of FIG. 5, where the location corresponds to a cache line of command queue 238 that includes current contents of the next slot to be written, and where the next slot to be written is determined from the current position of the command queue pointer. Upon detecting the CPU write, the I/O device controller in step 612 reads the contents of the next slot from I/O device controller memory 216. If a zero value is read, the I/O device controller determines the contents to be an invalid command and if a non-zero value is read, the I/O device controller determines the contents to be a valid command. If the command is invalid (step 614; No), the I/O device controller returns to step 612 after a preset period of time (thus waiting for the cache line including updated contents of the next slot to be written out to the location of the cache line in I/O device controller memory 216) and re-executes step 612. If the command is valid (step 614, Yes), the I/O device controller in step 616 sets the state of the command to be invalid by writing zero in the slot and in step 618 increments the command queue pointer to set the location of the next slot to be written. In step 620, the I/O device controller executes the valid command.

FIG. 7 depicts a flow of operations carried out by the I/O device controller after carrying out command execution depicted in FIG. 6. The method of FIG. 7 begins in step 728 with a check to see if completion queue 239 is full. If completion queue 239 is not full (step 728; No), the I/O device controller in step 736 writes out the result of the command execution in the next slot to be written in completion queue 239, where the next slot to be written is determined from the current position of the completion queue pointer.

On the other hand, if completion queue 239 is full (step 728; Yes), the device controller waits for the next slot in completion queue 239 to free up. Step 730 represents the I/O device controller detecting a CPU write to a cache line that includes contents of the next slot in completion queue 239. Upon detecting the CPU write, the I/O device controller in step 732 reads the result stored in the next slot of completion queue 239. Then, in step 734, the I/O device controller determines if the state of the result is invalid (e.g., zero). An invalid state means that the slot has been freed up. If the state of the result is valid (Step 734; No), the I/O device controller returns to step 732 after a preset period of time (thus waiting for the cache line including updated contents of the next slot to be written out to the location of the cache line in I/O device controller memory 216) and re-executes step 732. In the arrangement of FIG. 2B, the I/O device controller does not poll the completion queue (steps 732 and 734) for a slot to be freed up. The I/O device controller waits instead for an invalidation event caused by the CPU writing to the slot. If the state of the result is invalid (Step 734; Yes), the I/O device controller in step 736 writes out the result of the command execution in the next slot to be written in completion queue 239.

In step 738, the I/O device controller increments the completion queue pointer. At this time, the I/O device controller may issue an interrupt on the coherence interconnect in embodiments where the interrupt is employed to inform the CPU that the command execution result is now ready to be read.

Figure 8:
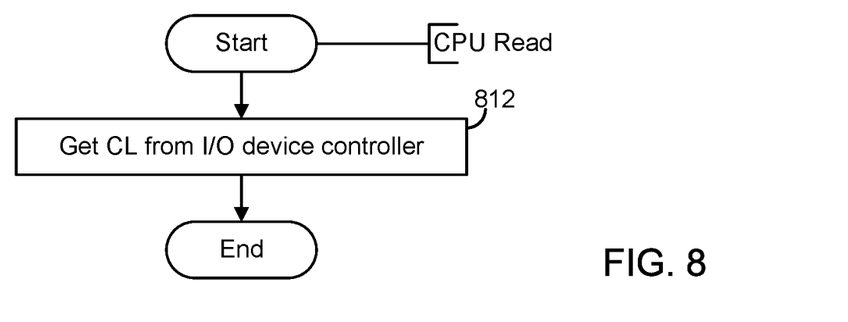
FIG. 8 depicts a flow of operations for a CPU read of a cache line.
Figure 9:
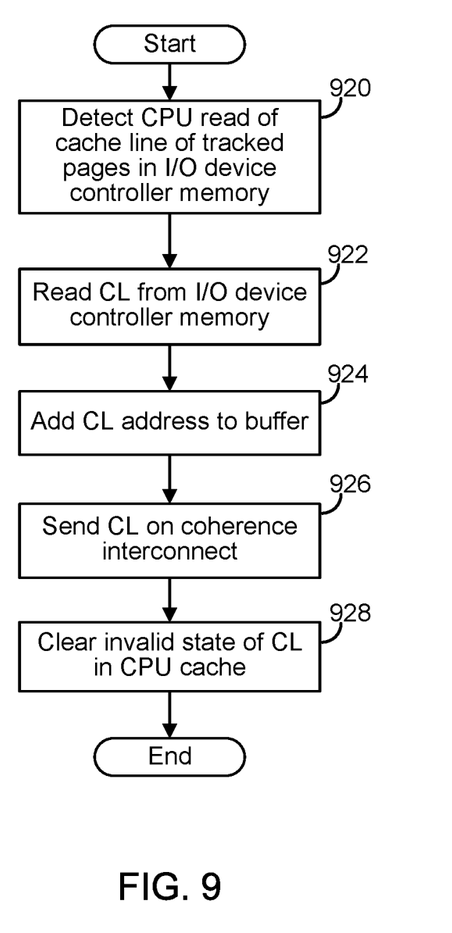
FIG. 9 depicts a flow of operations of the I/O device controller responding to the cache-line read by the CPU.

FIG. 8 depicts a flow of operations for a CPU read of a cache line from I/O device controller memory 216. In step 812, the CPU issues a read transaction for the cache line on the coherence interconnect. The read transaction includes the address of the cache line to be read. In the embodiment in which the I/O device controller operates with I/O device controller memory 216, I/O device controller 112/162 obtains the requested data from I/O device controller memory 216 and presents a cache line containing the requested data on the coherence interconnect. In the embodiment in which the I/O device controller operates with cache 234 and CPU memory 206, I/O device controller 112/162 responds to an invalidation event (e.g., a snoop) on the coherence interconnect directed at cache 234, where the response includes the cache line containing the requested data.

FIG. 9 depicts a flow of operations of the read/write module (e.g., read/write module 214) of the I/O device controller responding to the CPU read of a cache line in one of the pages that are being tracked by the CPU, which is detected in step 920. The read/write module reads the cache line from I/O device controller memory 216 in step 922 and adds the cache line address to the buffer in step 924. Then, the read/write module in step 926 sends the cache line on the coherence interconnect and in step 928 clears the invalid state of this cache line, which the read/write module is tracking in the buffer. By tracking this state, the read/write module knows whether or not to send an invalidate message on the coherence interconnect if the cache line that was previously read by the CPU (and thus loaded into the CPU cache) has been modified. The process ends after step 928.

Figure 10:
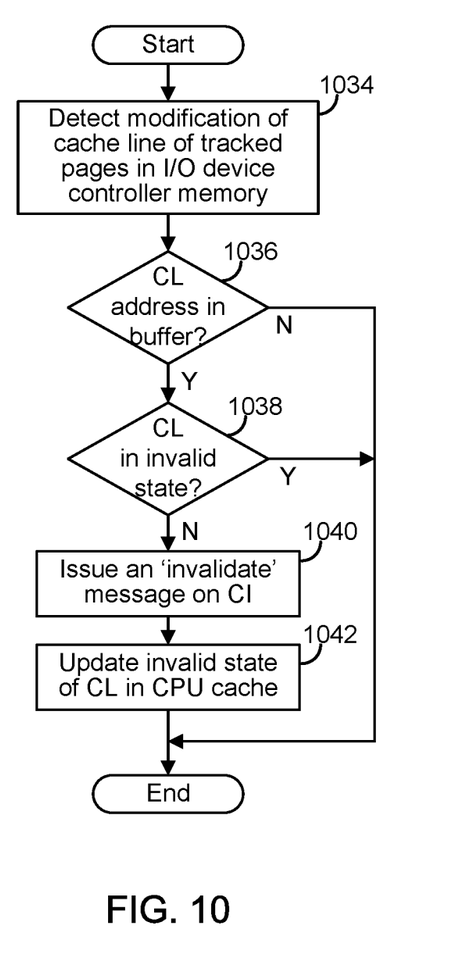
FIG. 10 depicts a flow of operations of the I/O device controller when a cache line tracked by the CPU is modified.

FIG. 10 depicts a flow of operations of the read/write module (e.g., read/write module 214) of the I/O device controller when a cache line in one of the pages tracked by the CPU is modified. The modification of the cache line is detected in step 1034, e.g., when a write-back transaction for the cache line is detected on the coherence interconnect. Then, in step 1036, the read/write module determines if the cache line address of the cache line is in the buffer. If so (step 1036; Yes), the read/write module in step 1038 checks the buffer to see if the cache line is in the invalid state (i.e., has been previously invalidated). If not (step 1040; No), the read/write module in step 1040 sends the message to invalidate the cache line on the coherence interconnect and in step 1042 updates the invalid state of the cache line that it is tracking in the buffer to an "invalid" state.

Returning to step 1036, if the cache line address of the cache line is not in the buffer (step 1036; No), this means that the cache line is not in the CPU cache and so the process ends without sending any invalidate message on the coherence interconnect. Also, in step 1038, if the cache line is already in the invalid state, this means that the cache line in the CPU cache has been previously invalidated and so the process ends without sending any invalidate message on the coherence interconnect.

Thus, what appears to be memory-based communication between the CPU and the I/O device controller is actually communication occurring over the coherence interconnect. There are two cases for the CPU and two cases for the I/O device controller.

When the CPU reads a memory location related to the I/O device controller using a read-for-ownership of the location, the data is updated (if it was dirty in some cache) in the CPU memory and invalidated in the I/O device controller cache. The data was transferred via the coherence interconnect and now resides in the CPU cache in the exclusive state.

When the CPU writes a memory location related to the I/O device controller using a cache write, a read-for-ownership of the location is first performed, after which a silent write occurs. The data is now changed from the exclusive state to the modified state in the CPU cache and invalid elsewhere. A snoop retrieves the data in the CPU cache over the coherence interconnect, invalidates the CPU cache, and updates the CPU memory.

The I/O device controller performs reads and writes in the same way as the CPU.

In the embodiments, reads of cache lines of tracked pages in I/O device controller memory 216 are efficient for the following reason. If the cache line to be read has been previously invalidated and the same cache line is modified again, it is not necessary to send a message to invalidate the cache line in the CPU cache a second time.

Certain embodiments as described above involve a hardware abstraction layer on top of a host computer. The hardware abstraction layer allows multiple contexts to share the hardware resource. These contexts are isolated from each other in one embodiment, each having at least a user application program running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application program runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers, each including an application program and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application program's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained only to use a defined amount of resources such as CPU, memory, and I/O.

Certain embodiments may be implemented in a host computer without a hardware abstraction layer or an OS-less container. For example, certain embodiments may be implemented in a host computer running a Linux® or Windows® operating system.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, random-access memory (e.g., a flash memory device), a CD (Compact Discs) —CD-ROM, a CDR, or a CD-RW, a DVD (Digital Versatile Disc), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of operating an I/O device controller that is connected to a processor via a coherence interconnect, wherein the I/O device controller includes registers, the method comprising:
    mapping the registers to a cache cohernt memory space of the processor, and allocating a command queue and a completion queue in the cache coherent memory space, wherein processor interactions with I/O device controller, including reading from and writing to the registers of I/O device controller, are carried out thorugh the cache coherent memory space;
    tracking accesses of the processor to cache line of registers, the command queue, and completion queue in the cache coherent memory space and detecting, as a result of said tracking, that the processor acquired ownership a first cache line, wherein the first cache line is one of a plurality of cache lines of the command queue stored in the cache coherent memory space and retrieved into a cache of the processor;
    in response to a write-back transaction issued on the coherence interconnect, writing the first cache line to the cache coherent memory space, retrieving a command from the first cache line and executing the command; and
    writing a result of executing the command to a second cache line, wherein the second cache line is one of a plurality of cache lines of the completion queue stored in the cache coherent memory space.

2. The method of claim 1, wherein
    the first cache line is updated by the processor to add the command to a free slot of the command queue after the processor acquired ownership of the first cache line, and the result is added to a free slot of the completion queue by the I/O device controller.

3. The method of claim 2, wherein each cache line of the command queue and the completion queue includes a plurality of slots.

4. The method of claim 1, further comprising:
    causing the write-back transaction to be issued by the processor on the coherence interconnect.

5. The method of claim 4, further comprising:
    sending a snoop message on the coherence interconnect to cause the processor to issue the write-back transaction on the coherence interconnect.

6. The method of claim 1, further comprising:
    detecting a request on the coherence interconnect for the first cache line; and
    sending the first cache line on the coherence interconnect.

7. The method of claim 6, further comprising:
    storing an address of the first cache line in a buffer; and
    in response to another request on the coherence interconnect for the first cache line,
    sending a message to invalidate the first cache line on the coherence interconnect and
    updating a state of the first cache line in the buffer to indicate that the first cache line is in an invalid state.

8. A non-transitory computer-readable medium comprising instructions that are executable in an I/O device controller that is connected to a processor via a coherence interconnect, wherein the I/O device controller executes the instructions to carry out the steps of:
    mapping the registers to a cache conherent memory space of the processor, and allocating a command queue and a completion in the cache coherent memory space, wherein processory interactions with the I/O device controller, including reading from and writing to the registers of the I/O device controller, are carried out through the cache coherent memory space;
    tracking accesses of the processor to cache lines of the registers, the command queue, and the completion queue in the cache coherent memory space detecting, as a result of said tracking, that the processor acquired ownership of a a first cache line, wherein the first cache line is on of plurality of cache lines of the command queue stored in a the cache coherent memory space and retrieved into a cache of the processor;
    in response to a write-back transaction issued on the coherence interconnect, writing the first cache line to the cache coherent memory space, retrieving a command from the first cache line and executing the command; and
    writing a result of executing the command to a second cache line, wherein the second cache line is one of a plurality of cache lines of the completion queue stored in the cache coherent memory space.

9. The non-transitory computer-readable medium of claim 8, wherein
    the first cache line is updated by the processor to add the command to a free slot of the command queue after the processor acquired ownership of the first cache line, and tthe result is added to a free slot of the completion queue by the I/O device controller.

10. The non-transitory computer-readable medium of claim 9, wherein each cache line of the command queue and the completion queue includes a plurality of slots.

11. The non-transitory computer-readable medium of claim 8, wherein the steps further include:
    causing the write-back transaction to be issued by the processor on the coherence interconnect.

12. The non-transitory computer-readable medium of claim 11, wherein the steps further include:

sending a snoop message on the coherence interconnect to cause the processor to issue the write-back transaction on the coherence interconnect.

13. The non-transitory computer-readable medium of claim 8, wherein the steps further include:
detecting a request on the coherence interconnect for the first cache line; and
sending the first cache line on the coherence interconnect.

14. The non-transitory computer-readable medium of claim 13, wherein the steps further include:
storing an address of the first cache line in a buffer; and
in response to another request on the coherence interconnect for the first cache line, sending a message to invalidate the first cache line on the coherence interconnect and updating a state of the first cache line in the buffer to indicate that the first cache line is in an invalid state.

15. A computer system comprising:
a processor; and
an I/O device controller communicating with the processor via a coherence interconnect and according to a cache coherence protocol, wherein the I/O device controller includes registers that are mapped to a cache coherent memory space of the processor and a command queue and a completion queue that are also allocated in the cache coherent memory space, and wherein processor interactions with I/O device controller, including reading from and writing to the registers of the I/O device controller, are carried out through the cache coherent memory space,
the I/O device controller configured to:
track accesses of the processor to cache lines of the registers, the command queue, and the completion queue in the cache coherent memory space and detect, as a result of said tracking, that the processor acquired ownership of a first cache line, wherein the first cache line is one of plurality of cache lines of the command queue stored in the cache coherent memory space and retrieved into a cache of the processor;
in response to a write-back transaction issued on the coherence interconnect, write the first cache line to the cache coherent memory space, retrieve a command from the first cache line, and execute the command; and
write a result of executing the command to a second cache line, wherein the second cache line is one of plurality of cache lines of the completion queue stored in the cache coherent memory space.

16. The computer system of claim 15, wherein
the first cache line is updated by the processor to add the command to a free slot of the command queue after the processor acquired ownership of the first cache line, and
the result is added to a free slot of the completion queue by the I/O device controller.

17. The computer system of claim 16, wherein each cache line of the command queue and the completion queue includes a plurality of slots.

18. The computer system of claim 15, wherein the I/O device controller is futher configured to:
cause the write-back transaction to be issues by the processor on the coherence interconnect.

19. The computer system of claim 18, wherein the I/O device controller is further configured to:
send a snoop message on the coherence interconnect to cause the processor to issue the write-back transaction on the coherence interconnect.

* * * * *